United States Patent
Buentello et al.

(10) Patent No.: US 12,530,006 B1
(45) Date of Patent: Jan. 20, 2026

(54) SYSTEMS AND METHODS FOR SMART HOME UNIFICATION VIA SENSOR-BASED DETECTION

(71) Applicant: United Services Automobile Association (USAA), San Antonio, TX (US)

(72) Inventors: Andre Rene Buentello, San Antonio, TX (US); Nathan Lee Post, Rockport, TX (US); Justin Royell Nash, Little Elm, TX (US); Gregory David Hansen, San Antonio, TX (US); Jose L. Romero, Jr., San Antonio, TX (US); Brian Francisco Shipley, Plano, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 553 days.

(21) Appl. No.: 17/900,519

(22) Filed: Aug. 31, 2022

Related U.S. Application Data

(60) Provisional application No. 63/239,132, filed on Aug. 31, 2021.

(51) Int. Cl.
*G05B 19/042* (2006.01)

(52) U.S. Cl.
CPC .... *G05B 19/042* (2013.01); *G05B 2219/2642* (2013.01)

(58) Field of Classification Search
USPC ......................................................... 700/28
See application file for complete search history.

(56) References Cited

U.S. PATENT DOCUMENTS

| | | | |
|---|---|---|---|
| 10,142,122 B1* | 11/2018 | Hill | H04L 12/2807 |
| 2014/0351181 A1* | 11/2014 | Canoy | G06N 20/00 706/12 |

(Continued)

OTHER PUBLICATIONS

"Classifying IoT Devices in Smart Environments Using Network Traffic Characteristic", IEEE, Aug. 2019, p. 1745-1759. (Year: 2019).*

(Continued)

*Primary Examiner* — Hien D Khuu
(74) *Attorney, Agent, or Firm* — Fletcher Yoder, PC

(57) ABSTRACT

A system includes a computing device comprising a processor and a memory with instructions configured to cause the processor to identify smart devices communicating with service providers and extract smart device data associated with the smart devices. The smart device data is indicative of command signals sent from the service providers to control the smart devices to perform actions. The processor may identify sensors disposed within a proximity of the smart devices and configured to collect sensor data associated with the smart devices and receive the sensor data from the sensors, where the sensor data is indicative of the actions performed by the smart devices. The processor may identify command assumptions based on the sensor data and the smart device data, where the command assumptions correspond to a content of the command signals and provide the command assumptions to an electronic device for display.

20 Claims, 4 Drawing Sheets

(56) References Cited

U.S. PATENT DOCUMENTS

| | | | |
|---|---|---|---|
| 2015/0372833 A1* | 12/2015 | Karp | F24F 11/30 |
| | | | 700/275 |
| 2016/0102878 A1* | 4/2016 | Smith | H04L 43/0805 |
| | | | 709/217 |
| 2018/0007141 A1* | 1/2018 | Hall | H04L 67/10 |
| 2019/0163973 A1* | 5/2019 | Keohane | G06V 10/764 |
| 2019/0166034 A1* | 5/2019 | Hanusiak | G06Q 10/20 |
| 2019/0268177 A1* | 8/2019 | Li | H04L 12/2834 |
| 2020/0295597 A1* | 9/2020 | Wootton | H05B 47/19 |
| 2022/0051666 A1* | 2/2022 | Rodriguez Bravo | G06F 3/017 |

OTHER PUBLICATIONS

JP_2017191612_A (Year: 2017).*

\* cited by examiner

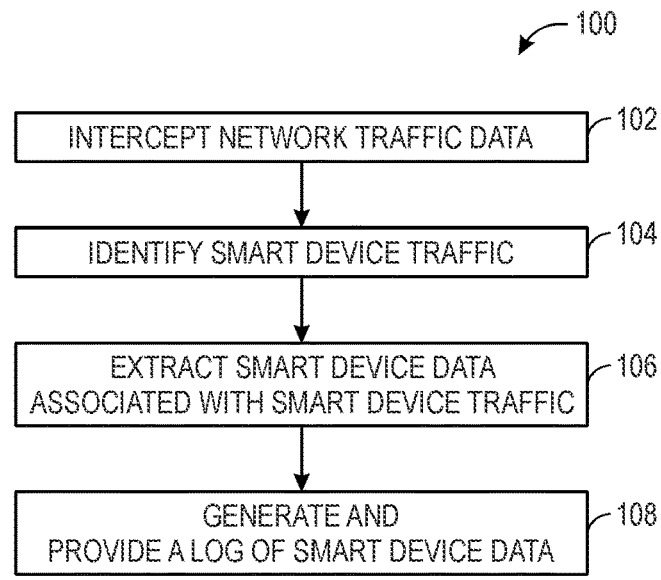

FIG. 3

| | SOURCE 208 | PAYLOAD 210 | DESTINATION 212 | TIME 214 |
|---|---|---|---|---|
| 204 | COMP 1  220 | DATA X | GOOGLE.COM | 10:01 AM |
| 206 | SMART DEVICE 1  220<br>MAC: ABC 345 XYZ  222 | DATA Y | RING.COM | 2:45 PM |
| | SMART DEVICE 2  220<br>MAC: XYZ 899 ABC  222<br>LOC: LIVING ROOM 1  224 | DATA Z | PHILLIPSSMART.COM | 9:45 PM |
| | SMART DEVICE 3  220<br>MAC: LMN 345 QRS  222<br>LOC: FRONT DOOR 1  224 | DATA A | SCHLAGESMART.COM | 9:45 PM |
| | SMART DEVICE 4  220<br>MAC: ABC 567 ZBD  222 | DATA B | RING.COM | 10:15 PM |

300

| LOG FILE | | |
|---|---|---|
| ENTRY 302 | ACTION 304 | TIME 306 |
| 1 | RING ALARM COMMAND WAS PROCESSED! | 2:45 PM |
| 2 | PHILLIPS DEVICE COMMAND WAS PROCESSED! | 9:45 PM |
| 3 | SCHLAGE DEVICE COMMAND WAS PROCESSED! | 2:45 PM |

FIG. 4

SYSTEMS AND METHODS FOR SMART HOME UNIFICATION VIA SENSOR-BASED DETECTION

CROSS-REFERENCE TO RELATED APPLICATIONS

This application claims priority to and the benefit of U.S. Provisional Application No. 63/239,132, entitled "Systems and Methods for Smart Home Unification via Sensor Based Detection," filed on Aug. 31, 2021, which is hereby incorporated by reference in its entirety for all purposes.

BACKGROUND

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Smart device technology is becoming more prevalent inside and outside a user's home to control various activities that a user may wish to be automated. Such smart devices may send information to a router and the router may direct the information to a service provider associated with the smart device such that a response input (e.g., a command) may be generated by the service provider associated with the smart device and communicated back through the router to allow the smart device to perform a particular action (e.g., scheduling a smart light switch to turn on/off at a specified time and receiving the command to turn off the light from the service provider at the specified time). As a number of smart devices used to monitor and perform various activities increases, an amount of information communicated via the router may also increase. However, the router may be unaware of the content of the information that is communicated to and from the service providers. That is, the router may communicate commands that correspond to particular actions, without knowing the content of the command. It is now recognized that various advantages may be gained by providing sensors that may send additional information to the router in response to particular smart device activity, such that the router may be made aware of the content of a command, thereby allowing the router to control other smart devices.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a system includes a computing device comprising a processor and a memory, where the memory stores instructions that are configured to cause the processor to identify one or more smart devices communicating with one or more service providers and extract smart device data associated with the one or more smart devices. The smart device data is indicative of one or more command signals sent from the one or more service providers and configured to control the one or more smart devices to perform one or more actions. The instructions may also cause the processor to identify one or more sensors disposed within a proximity of the one or more smart devices, where the one or more sensors are configured to collect sensor data associated with the one or more smart devices and receive the sensor data from the one or more sensors, where the sensor data is indicative of the one or more actions performed by the one or more smart devices. The instructions may also cause the processor to identify one or more command assumptions based on the sensor data and the smart device data, where the one or more command assumptions correspond to a content of the one or more command signals and provide the one or more command assumptions to an electronic device for display.

In another embodiment, a non-transitory, computer-readable medium includes computer-executable instructions that, when executed, are configured to cause a processor to identify one or more smart devices communicating with one or more service providers over a network and extract smart device data from the one or more smart devices, where the smart device data is indicative of one or more commands sent from the one or more service providers configured to control the one or more smart devices to perform one or more actions. The processor may also receive sensor data corresponding to the smart device data from one or more sensors disposed within a proximity of the one or more smart devices, where the sensor data is indicative of the one or more actions performed by the one or more smart devices. The processor may also compare the smart device data and the sensor data and generate one or more command assumptions based on comparing the smart device data and the sensor data, where the one or more command assumptions are indicative of a content of the one or more commands.

In another embodiment, a method includes identifying, via a processor, one or more smart devices communicating with one or more service providers and extracting, via the processor, smart device data associated with the one or more smart devices, where the smart device data is indicative of one or more command signals sent from the one or more service providers and is configured to cause the one or more smart devices to perform one or more actions. The method further includes identifying, via the processor, one or more sensors disposed within a proximity of the one or more smart devices, where the one or more sensors are configured to collect sensor data associated with the one or more smart devices and receiving, via the processor, the sensor data from the one or more sensors, where the sensor data is indicative of the one or more actions performed by the one or more smart devices. The method further includes identifying, via the processor, one or more command assumptions based on the sensor data and the smart device data, where the one or more command assumptions correspond to a content of the one or more command signals and providing, via the processor, the one or more command assumptions to an electronic device for display.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the disclosed subject matter will become better understood when the following detailed description is read with reference to the accompanying drawings in which like characters represent like parts throughout the drawings, wherein:

FIG. 3 illustrates a flow chart of a method for generating and providing a log of smart device data communicated within the smart home management system of FIG. 1, in accordance with embodiments described herein;

FIG. 4 illustrates a data structure of smart device data and a data log file of smart device data communicated within the smart home management system of FIG. 1, in accordance with embodiments described herein;

DETAILED DESCRIPTION

Figure 1:
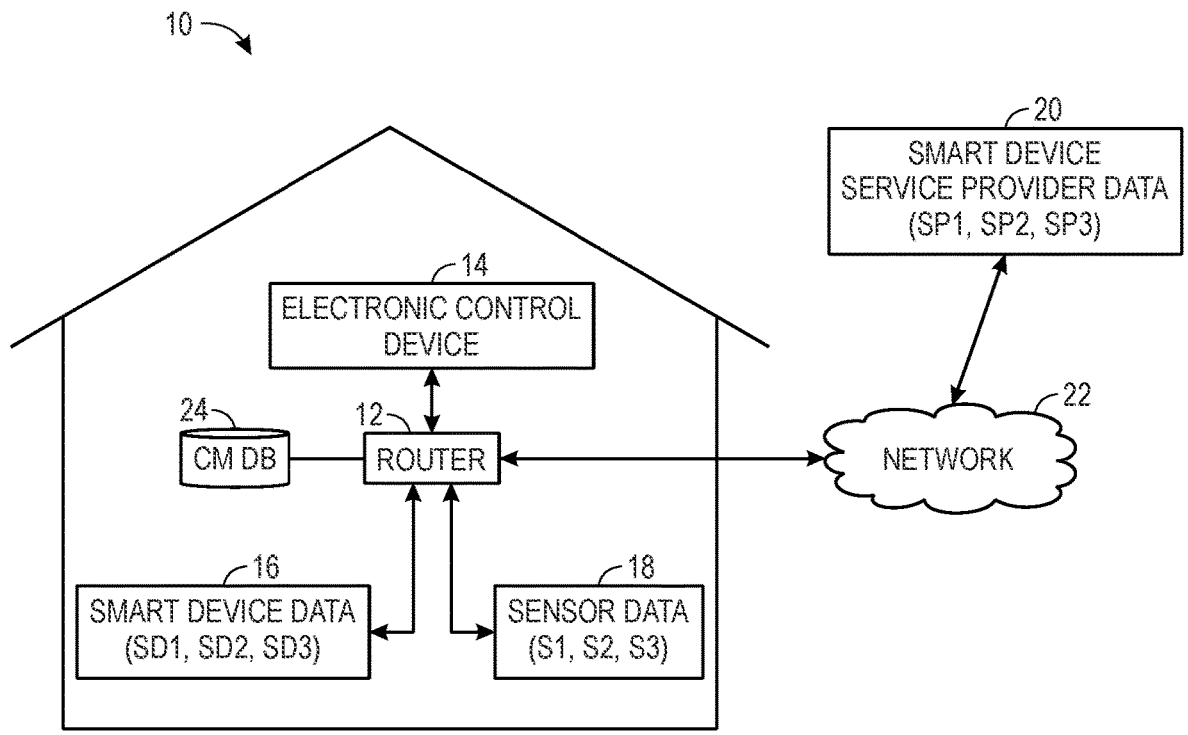
FIG. 1 illustrates a block diagram of a smart home management system for assessing smart device and sensor device data, in accordance with embodiments described herein.

The present disclosure relates generally to interpreting the content of smart device command inputs based on corresponding sensor data. More specifically, the present disclosure relates to receiving smart device data that includes command inputs configured to control various actions performed by the smart devices, and generating command assumptions (i.e., interpretations of the command inputs) based off of sensor data that corresponds to the actions performed by the respective smart devices.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an exemplary embodiment," or "an embodiment" of the present disclosure are not intended to be interpreted as excluding the existence of additional embodiments that also incorporate the recited features.

As may be appreciated, implementations of the present disclosure may be embodied as a system, method, device, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer-readable program code embodied thereon.

Smart home devices are devices that are connected with each other and can be accessed through one or more control points (e.g., a smart phone, tablet, laptop, game console, and the like) to control various activities that a user may wish to be automated. Smart home devices may communicate and send data to and from the control points and respective service providers associated with the smart devices via a router over a network. As data is communicated to and from the smart devices, the control points, and/or the service providers, the router may be unaware of the content of the data being communicated to the various devices. That is, due to the encrypted nature of the data oftentimes found with this type of communication, the router may only be aware of a source of the data and a destination for the data, without knowing what the data payload represents. For example, a user may wish to turn off a smart light switch via the user's central point (e.g., smart phone). The smart phone (e.g., source) may first send data indicative of the request through the router to the service provider (e.g., destination) associated with the smart light. The router may then receive a response input from the service provider (e.g., source) indicative of a "turn-off command," which the router relays to the smart light switch (e.g., destination) to turn the light switch off. Despite relaying the response input to turn the light switch off, the router may not be aware that the response input is a "turn-off command."

With this in mind, the advent of systems and methods that may track, monitor, and analyze the data sent via the router to and from the smart devices, control devices, and service providers using sensors disposed inside and outside of a user's home has made interpreting the data more feasible. That is, it may be beneficial to provide context-aware routers that employ sensors that can be used to detect a time certain data is sent and an associated action as a result of the data being sent (e.g., sensor detects a time that the lights turn off in response to the command), such that the router may be made aware of the content of the command (e.g., router knows that the data sent was a "turn-off command"). The present embodiments described herein may detail various hardware components and methodologies that may enable the router to identify the content of the data. By allowing the router to identify the content of the data, a data log file may be created and command assumptions may be generated to allow the user to control various other actions and devices, as described in greater detail below with reference to FIGS. 1-6.

By way of introduction, FIG. 1 illustrates a block diagram of a smart home management system 10 in which a router 12 may receive and send data that may be used to control various smart devices disposed within or outside of a user's home. Referring now to FIG. 1, the router 12 may receive data from various sources. The received data may be related to an activity or action that is scheduled to take place, a time of the activity, a smart device assigned to perform the activity, and the like. Using the collected data, the router 12 may determine the content of the data, thereby allowing the router 12 to store the data in a database 24 and create a data log file that may be displayed and used to create command assumptions to further control various components of the smart home management system 10 (e.g., control other smart devices connected to the system).

In some embodiments, the smart home management system 10 may be any suitable computing or server device. Using data sources accessible to the smart home management system 10, the router 12 may receive data regarding the actions and/or activities to be performed, the smart devices associated with the activities to be performed, and service providers associated with the activities to be performed. For example, the router 12 may receive data from sources such as an electronic control device 14 (e.g., smart phone, tablet, laptop, and the like) associated with a user, one or more smart devices 16, one or more sensors 18, and/or one or more smart device service providers 20. The data may be received in real-time or near-real time, thereby enabling the smart home management system 10 to perform the embodiments described herein in a timely manner to cover any related activities that are performed soon after.

The electronic control device 14 may be any suitable computing device capable of transmitting information or data associated with one or more of the smart devices 16 operating within the smart home management system 10. The electronic control device 14 may be a cellular phone, a wearable device (e.g., a smart watch), a tablet, a laptop, and the like, and may be associated with a user of the smart home management system 10. In some embodiments, the electronic control device 14 may send activity data associated with an operation to be performed by the one or more of the smart devices 16, such that the smart home management system 10 may control an action performed by the smart devices in response to the data being sent. For example, the electronic control device 14 may send activity data to the router 12 indicative of a schedule of various activities to be performed by various respective smart devices 16. In turn, this activity data may cause the router 12 to communicate with smart device service providers 18 to relay a command from the service provider to the respective smart device corresponding to the activity to be performed at the appropriate time. Further, the electronic control device 14 may send commands directly to associated smart devices to control operations. For example, a user may open an application operating on the user's electronic computing device 14 to send a command to close a garage door.

The one or more smart devices 16 may be any suitable electronic devices that are context-aware and are capable of performing autonomous computing and connecting to other devices for data exchange. The one or more smart devices 16 may also be a cellular phone, a wearable device, or any other device capable of receiving command signals from the router 12, the user electronic control device 14, the sensors 18, and/or the service providers 20 to perform a scheduled or requested activity. For example, the one or more smart devices may include a light switch, a garage door, a camera, a door lock, and the like that may be controlled by various other devices and data sources that are communicatively coupled to the one or more smart devices 16.

The sensors 18 may be any suitable electronic devices that are capable of measuring location, pressure, moisture, temperature, light, movement, and the like. The one or more sensors 18 may provide information and/or data about a time of an action, a location of the action, a smart device associated with the action, and the action itself (e.g., garage opened/closed, light turned on/off). The one or more sensors 18 may be disposed inside or outside of a user's home and may be configured to capture data associated with various actions or activities that are performed or controlled by the smart devices 16. For example, the one or more sensors 18 may include a camera or a microphone that captures image and/or sounds data associated with a smart door lock. Further, the one or more sensors 18 may include light detection sensors or movement sensors. For example, a command may be sent to a smart light switch to turn off a light, and a light detection sensor may be disposed within the room associated with the smart light switch such that when the light switch does turn off, the light detection sensor disposed within the room may send data indicative of the light turning off to the router 12.

The smart device service provider data 20 may include information and data associated with operations and actions to be performed by the various smart devices 16. The service provider data 20 may also include information about a time or a location of the action to be performed. Further, the service provider data 20 may also include command information that causes the one or more smart devices to perform a particular action. For example, a user may schedule to lock a smart door lock at a user's house each night at a specified time (e.g., lock door at 9 PM). At the specified time, the service provider data 20 may send a command through the router 12 to the associated smart device 16 (i.e., the smart door lock) such that the door may lock at the appropriate time.

In certain embodiments, the data sources may communicate with one another and with the router 12 over a network 22. The network 22 may be any suitable wired or wireless (e.g., radio or light based) network that may facilitate communication of data between the devices. In some embodiments, the network 22 may be a Wi-Fi network, a light detection and ranging (LIDAR) network, a LIDAR device, a 4G network, a 4G LTE network, a 5G network, a Bluetooth network, a Near Field Communication (NFC) network, or any suitable network for communicating information between devices. Communication via the network 22 may allow the devices and data sources connected to the network 22, to collect and communicate data pertaining to the activities and action controlled by the router 12 and performed by the one or more smart devices 16.

With the foregoing in mind, the router 12 of the smart home management system 10 may communicate primary data to and from the various sources described above to control the one or more smart devices 16 capable of performing various activities. As command signals are sent to and from the electronic control devices 14 and the service providers 20 to the one or more smart devices 16, the router 12 of the smart home management system 10 may also receive secondary data from the one or more sensors 18 to identify and determine the content of the data. That is, the router 12 may receive information from the one or more sensors 18 at a time that a command signal is sent to control the one or more smart devices 16, such that the router 12 may be made aware of the action that the command signal accomplishes. For example, a user may send a request (e.g., primary data) to close a smart garage door via the user's electronic control device 14. The electronic control device 14 may send the request through the router 12 to the service provider 20, and the service provider 20 may send a response command signal to the smart garage door to close the garage (e.g., close garage command). Concurrently, a movement sensor 18 disposed within the garage may send secondary data to the router 12 indicating that the garage door is closing. This secondary data may allow the router 12 to determine the content of the command (i.e., that the command was a close garage command). In turn, the router 12 may store this information in a database 24 and create a data log file that may be used to generate command assumptions. That is, as an increased number of observations are made by the sensors 18 and communicated to the router 12, the router 12 may be able to generate schedules and perform actions such that the router 12 itself may become a smart device capable of controlling the various smart devices 16 without having to communicate with the service provider 20. In some embodiments, particular sensors capturing the secondary data may be actuated or controlled to capture data at an increased frequency based upon an identified source and/or destination of the request. For example, if the request is sourced from a known garage door opener (e.g., which may be identified by a unique identifier of the garage door opener provided in the request) and/or the request has a known service provider destination (e.g., as indicated in the request) associated with the garage door opener, sensors in the vicinity of the garage door opener may be actuated to capture secondary data and/or commanded to capture secondary data at an increased frequency to identify the content of the request.

Figure 2:
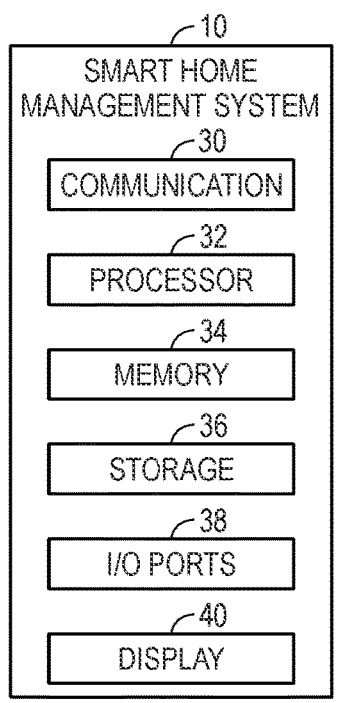
FIG. 2 illustrates a block diagram of a computing device that may be part of the smart home management system of FIG. 1, in accordance with embodiments described herein.

To perform some of the actions set forth above, each of the router 12, the electronic control devices 14, the smart devices 16, and/or the sensors 18 may include certain components to facilitate these actions. FIG. 2 is a block diagram of example components within the smart home management system 10. For example each of the devices operating within the smart home management system 10 may include a communication component 30, a processor 32, a memory 34, a storage 36, input/output (I/O) ports 38, a display 40, and the like. The communication component 30 may be a wireless or wired communication component that may facilitate communication and data transfer between the router 12, the electronic control device 14, the smart devices 16, the sensors 18, the service providers 20, and the like.

The processor 32 may be any type of computer processor or microprocessor capable of executing computer-executable code. The processor 32 may also include multiple processors that may perform the operations described below.

The memory 34 and the storage 36 may be any suitable articles of manufacture that can serve as media to store processor-executable code, data, or the like. These articles of manufacture may represent computer-readable media (e.g., any suitable form of memory or storage) that may store the processor-executable code used by the processor 32 to perform the presently disclosed techniques. The memory 34 and the storage 36 may also be used to store data described, various other software applications for analyzing the data, and the like. The memory 34 and the storage 36 may represent non-transitory computer-readable media (e.g., any suitable form of memory or storage) that may store the processor-executable code used by the processor 32 to perform various techniques described herein. It should be noted that non-transitory merely indicates that the media is tangible and not a signal.

The I/O ports 38 may be interfaces that may couple to other peripheral components such as input devices (e.g., keyboard, mouse), sensors 18, input/output (I/O) modules, and the like. The display 40 may operate to depict visualizations associated with software or executable code being processed by the processor 32. In one embodiment, the display 40 may be a touch display capable of receiving inputs from a user of the smart home management system 10. The display 40 may be any suitable type of display, such as a liquid crystal display (LCD), plasma display, or an organic light emitting diode (OLED) display, for example. Additionally, in one embodiment, the display 40 may be provided in conjunction with a touch-sensitive mechanism (e.g., a touch screen) that may function as part of a control interface for the smart home management system 10. It should be noted that the components described above with regard to the smart home management system 10 are exemplary components and the smart home management system 10 may include additional or fewer components as shown.

As noted above, in some embodiments, a user may have a number of smart devices disposed within or outside of the user's home. To control the smart devices, the user may send commands from a control device to a service provider associated with the smart device via a router, and the service provider may send a command signal back to the smart device via the router to cause the smart device to perform the particular activity or action. The router may also receive information from various sensors disposed within or outside of the user's home that may be indicative of a type of action that the command signal is configured to perform. That is, the router may receive information and data from the sensors at the time an activity is performed to determine a type of command and corresponding action associated with the command (e.g., on/off, close/open command) such that the router may become aware of the content of the data it is sending to and from the various devices. By receiving the secondary information from the various sensors, the router itself may generate a data log file and/or command assumptions that may be used to control the smart devices. Further, as the router stores additional observational information from the sensors, the router itself may become a smart device capable of controlling the additional smart devices autonomously in lieu of communicating with service providers.

With the foregoing in mind, FIG. 3 illustrates a flow chart of a method 100 employed by the smart home management system 10 for communicating smart device data between various devices of the smart home management system 10 and generating a log file of the smart device data. Although the following description of the method 100 is described in a particular order, it should be noted that the method 100 is not limited to the depicted order; and instead, the method 100 may be performed in any suitable order. In addition, although the smart home management system 10 is described as performing the method 100, it should be understood that the method 100 may be performed by any suitable computing device including, for instance, the router 12 and the like.

Referring now to FIG. 3, at block 102, the router 12 of the smart home management system 10 may receive or intercept network traffic data from the various devices operating within the smart home management system 10. As discussed above, the router 12 of the smart home management system 10 may receive data and information related to various activities being performed within the smart home management system 10 from various data sources including the electronic control device 14, the smart devices 16, the sensors 18, and/or the service provider data 20. Generally, the network traffic data received at block 102 may provide information regarding the various devices operating within the user's home, the device's specific vendors (e.g., service provider data), the type of device (e.g., a light bulb, a garage door, computer), and activities performed by the respective device. For example, the network traffic data may be indicative of a search request performed on a user's computing device or may be indicative of a smart device operating within the user's home, as described in greater detail below.

Based on the received network traffic data, the router 12 of the smart home management system 10 may, at block 104, identify smart device traffic data associated with the various smart devices disposed within and/or outside of a user's home. That is, a number of devices may be configured to operate within the smart home management system 10, and the router 12 may identify the devices as smart devices based on the devices being controlled by data sent from the electronic control device 14 and/or the service providers 20. For example, by intercepting network traffic data, the router 12 of the smart home management system 10 may determine that a particular device (e.g., a light switch) is controlled (e.g., turns on/off) by a command signal sent from the respective service provider 20 associated with the device, where the command signal is sent in response to a request from the electronic control device 14 to the respective service provider 20. The router 12 may identify smart devices via a smart device's MAC address, a special identifier, or based on a type of server that the device communicates with. In some embodiments, a user may manually enter or register certain devices as smart devices. Based on this information, the router 12 may identify the particular device as a smart device that is capable of autonomous control.

After identifying one or more smart devices operating within the smart home management system 10, the router 12 may, at block 106, extract smart device data associated with the smart device traffic data to identify additional information (e.g., manufacturer, vendor, service provider, type of smart device, activity performed by smart device) associated with the one or more smart devices. That is, upon identifying the one or more smart devices, the router 12 may extract additional information that can be used to determine a service provider or vendor associated with the smart device, a time the device is controlled, an activity performed by the smart device, and/or that the smart device is of a particular type. For example, the router 12 may extract data indicative of a server that the smart device communicates with which may be associated with a particular vendor, such that the router may identify the respective vendor. Further, the router 12 may extract data indicative of a particular smart device's MAC address. The MAC address may also provide information related to a particular vendor, and additionally may provide information on a type of smart device. For example, a first portion of the MAC address may indicate that a particular vendor (e.g., Phillips) is associated with the smart device, and a second portion of the MAC address may indicate that the smart device belongs to a particular type (e.g., a light bulb), such that the router 12 may determine that the particular smart device is a Phillips light bulb capable of being controlled via the smart home management system 10. The router 12 may extract data from a number of smart devices operating within the smart home management system 10.

After extracting smart device data associated with the one or more smart devices, the smart home management system 10 may, at block 108, generate a data structure of the smart device data and provide a log of the smart device data for display on a user's computing device (e.g., electronic control device 14), as illustrated in FIG. 4. The generated log may provide an indication of a command being processed by a particular smart device, such that a user may easily identify a time that the command was processed, a vendor associated with the command, and other associated information that may be used by the router 12 to extend the data structure of the smart device data, as described in greater detail below with respect to FIG. 5.

Figure 5:
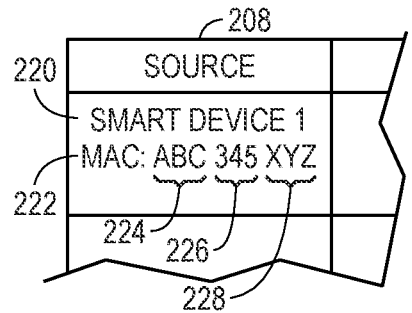
FIG. 5 illustrates an expanded view of data log file of smart device data of FIG. 4, in accordance with embodiments described herein.

FIG. 4 is an embodiment of a screen 200 that may be employed for viewing and/or managing a network traffic data structure 201 corresponding to network traffic data and a smart device traffic data structure 202 associated with smart devices operating within the smart home management system 10. Further, the screen 200 may be employed for viewing a log file 300 indicative of particular commands being processed by the one or more smart devices. As shown in the illustrated embodiment, the data structure 201 may be indicative of data associated with a computing device 204 and the data structure 202 may be indicative of data associated with one or more smart devices 206 operating within the smart home management system 10. As discussed above with respect to FIG. 3, the smart home management system 10 may extract smart device data associated with the smart device traffic, and use the extracted data to populate one or more fields of the smart device data structure 202. For example, the smart device data structure 202 may include a source field 208, a payload field 210, a destination field 212, and a time field 214. The source field 208 may include a device name 220 and/or a MAC address 222 associated with the device. The device name 220 may be indicative of a type of device (e.g., general purpose computer, smart device) operating and communicating via the router 12 of the smart home management system 10. As described above, the MAC address 222 may also be indicative of a vendor associated with the device, a type of device, and a unique identifier associated with the particular smart device. For example, as illustrated in FIG. 5, the MAC address 222 associated with "Smart Device 1" may include a first portion 224 (e.g., ABC) indicative of the vendor associated with the device (i.e., Ring), a second portion 226 (e.g., 345) indicative of a type of device (i.e., an alarm device), and a third portion that is unique to the particular smart device 206 (i.e., Smart Device 1). Returning to FIG. 4, the MAC address corresponding to a particular smart device may have similar information when compared with the MAC address of an additional smart device. For example, the first portion 224 of the MAC address 222 of "Smart Device 1" is "ABC" which, as described above, may indicate that Ring is the vendor associated with Smart Device 1. Similarly, the first portion 224 of the MAC address 222 of "Smart Device 2" is also "ABC," and thus, "Smart Device 2" may also be associated with the vendor Ring. In some embodiments, the source field 208 may also include information associated with a location 224 of the smart device which may be used to help generate command assumptions and determine the content of the command data, as described in greater detail below.

The payload field 210 may include information indicative of the data file being communicated to and from the associated device via the router 12. That is, the data in the payload field 210 may be command data associated with the command protocol used to control operation of the associated device. The destination field 212 may include information related to a particular destination that the data from a particular device is being sent to. That is, the destination field 212 may include data associated with a particular vendor's server such that the smart home management system 10 may identify which vendors are associated with and/or control particular devices operating within the smart home management system 10. For example, "Smart Device 2" is associated with the "Phillipssmart.com" server, and thus, the smart home management system 10 is able to determine that Phillips is the vendor that controls activities performed by "Smart Device 2." The data structure 202 may also include a time field which may include data indicative of a time that data (e.g., a command) is sent. In some embodiments, the smart home management system 10 may also generate a data log file 300. The data log file 300 may be generated in response to certain commands sent via the router 12 being processed, such that a user may be able to identify which devices have responded to certain commands. For example, as illustrated, the data log file 300 may include an entry field 302, an action field 304, and a time field 306. The entry field 302 may be indicate a number of commands that have been processed by the router 12, the action field 304 may indicate that a particular command was processed, and the time field 306 may indicate a time at which a particular command was processed. By providing the log file 300, a user of the smart home management system 10 may view times at which certain commands are processed, which in combination with additional sensor data, may be used to determine command assumptions, as described in greater detail below.

Figure 6:
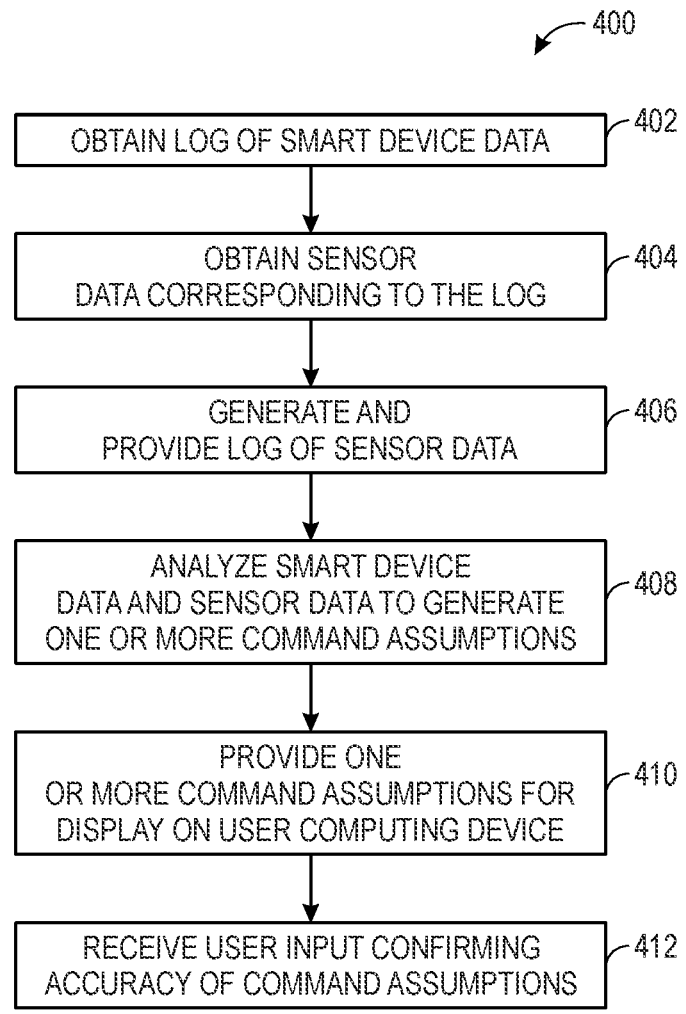
FIG. 6 illustrates a flow chart of a method for providing one or more command assumptions based on smart device data and sensor data detected within the smart home management system of FIG. 1, in accordance with embodiments described herein.

FIG. 6 illustrates a flow chart of a method 400 employed by the smart home management system 10 for determining the content of the data files sent to and from the various smart devices operating within the smart home management system 10, and generating command assumptions based off of received sensor data. Although the following description of the method 400 is described in a particular order, it should be noted that the method 400 is not limited to the depicted order; and instead, the method 400 may be performed in any suitable order. In addition, although the smart home management system 10 is described as performing the method 400, it should be understood that the method 400 may be performed by any suitable computing device including, for instance, the router 12 and the like. Further, it should be noted that the method 400 may include the steps of method 100 of FIG. 3.

Referring now to FIG. 6, at block 402, the smart home management system 10 may obtain a data log file of smart device data. The data log file may be obtained via the method 100 described above with respect to FIG. 3. As described above, the data log file may be indicative of a number of actions or commands being processed and a respective time associated with the processed commands.

After generating the data log file according to the method 100 of FIG. 3, the router 12 of the smart home management system 10 may, at block 404, receive sensor data from one or more sensors 18 disposed within or outside of the user's home that corresponds with the generated data log file. That is, one or more sensors 18 disposed within or outside of the user's home may send sensor data to the router 12 in response to data and/or commands being processed (e.g., data from the payload field 210 indicative of a command or action being processed), which may correspond with the data in the data log file 300 of FIG. 3. As noted above, the one or more sensors 18 may be configured to measure location, pressure, moisture, temperature, light, movement, and the like. For example, with respect to "Smart Device 2" of FIG. 3, the router 12 may receive sensor data from a light sensor disposed within a proximity of "Smart Device 2" in response to the payload 210 (i.e., "Data Z") being sent to the destination 212 (i.e., "Phillipssmart.com"), and the command (e.g., command data associated with "Data Z") being processed. The sensor data received from the one or more sensors 18 may provide information on the content of the command that is being processed. For example, an increase in an amount of light sensed by the light sensor may indicate that the command was an "ON Command," while a decrease in the amount of light sensed by the light sensor may indicate that the command was an "OFF Command."

Figure 7:
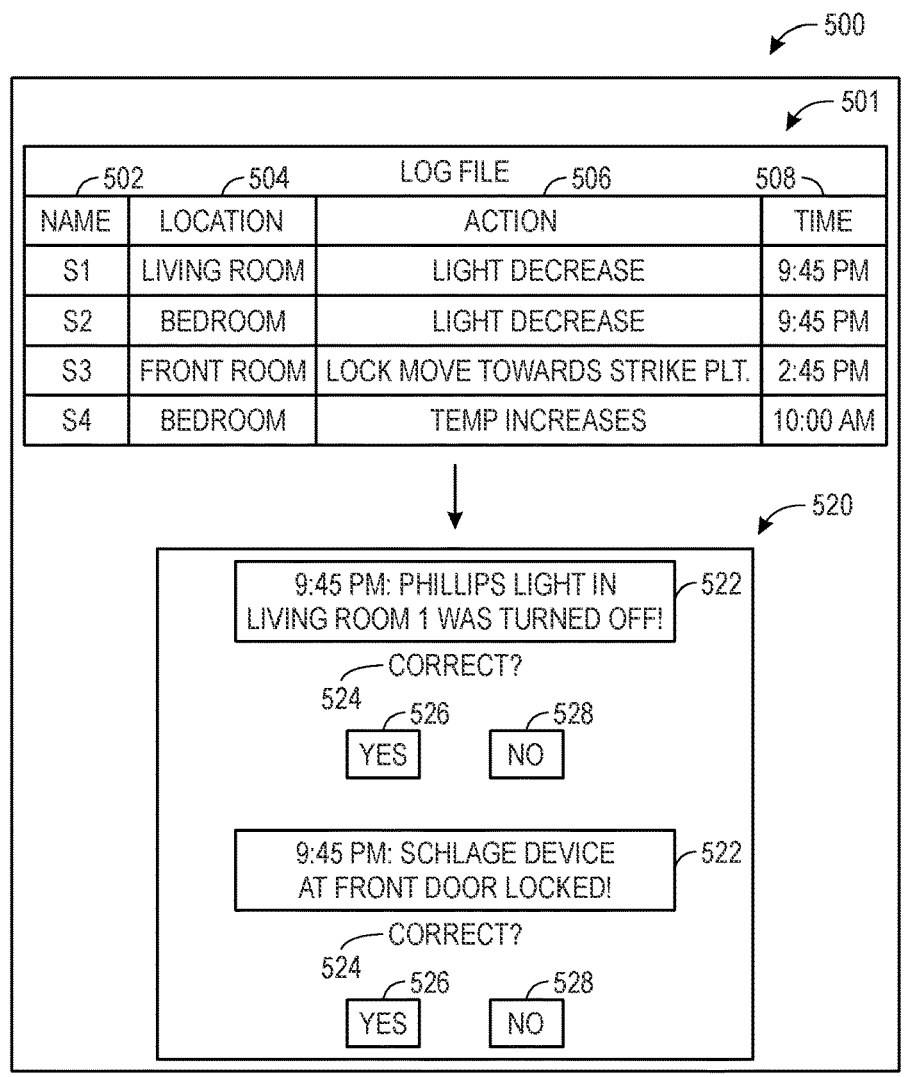
FIG. 7 illustrates a data log file of sensor data detected within the smart home management system of FIG. 1, in accordance with embodiments described herein.

Based on the received sensor data, the smart home management system 10 may, at block 406, generate and provide a log of sensor device data for display on a user's computing device, as illustrated in FIG. 7. As described above, the sensor data may correspond with the smart device data communicated in FIG. 3. That is, as one or more commands are processed by the various smart devices operating within the smart home management system 10, the smart home management system 10 (e.g., the router 12) may receive corresponding sensor data that may provide information on an action performed (e.g., content of the data) in response to the command data being processed. The generated log of sensor data may provide an indication of a location of the respective sensor device sending the sensor data, a time that the sensor data was measured, and an associated action that the sensor detects (e.g., movement, increase and/or decrease of light, increase and/or decrease of sound, and the like).

FIG. 7 is an embodiment of a screen 500 that may be employed for viewing and/or managing a data log file of sensor data 501 that may be generated based on the one or more sensors 18 detecting various actions performed by the smart devices. The data log file of sensor data 501 may include a name field 502, a location field 504, an action field 506, and a time field 508. The name field 502 may be indicative of a name or identifier of a particular sensor of the one or more sensors 18. The location field 504 may be indicative of a location of a sensor device (e.g., a room within the house). The action field 506 may be indicative of a type of action performed by the smart device and detected by the sensor. That is, when a smart device is called upon to perform an action based on command data (e.g., data from payload field 210 of FIG. 3) sent from a service provider, a sensor disposed within a proximity of the respective smart device may detect activity data and send the activity data to the smart home management system 10 which may be used to determine the content of the command data being sent. The time field 508 may be indicative of a time at which the activity data was detected. By providing the screen 500, a user can view and compare the data log file of sensor data 501 with the data log file 300 of FIG. 4. In some embodiments, a user may be able to confirm whether certain sensed or detected data accurately corresponds to a command being processed, thereby increasing the accuracy of the smart home management system 10 in generating assumptions, as described in greater detail below.

Returning to FIG. 6, the smart home management system 10 may, at block 408, analyze and compare the smart device data and the corresponding sensor data to generate command assumptions. For example, as illustrated in FIG. 7, "S1" is disposed in "Living Room 1," and at 9:45 PM, S1 detected that an amount of light in Living Room 1 decreased. As illustrated in FIG. 4, "Smart Device 2" has a location 224 corresponding to "Living Room 1" and "Entry 2" of the data log file 300 of FIG. 4 indicates that the "Phillips Device command was processed" at 9:45 PM. By comparing the data from the data log file of sensor data 501 with the data from the smart device data structure 202 and the log file 300 of FIG. 4, the smart home management system 10 may determine that the Phillips Device is located in Living Room 1, and the Phillips Device command that was processed at 9:45 PM corresponds to the sensor data detected by S1. Thus, the smart home management system 10 may generate an assumption that the Phillips Device command was an "OFF-Command" based on the detected sensor data from S1 indicating the decrease in light in Living Room 1.

As another example, "S3" of FIG. 7 is disposed at the "Front Door," and at 9:45 PM, S3 detected that a lock moved towards the strike plate. As illustrated in FIG. 4, "Smart Device 3" has a location 224 corresponding to "Front Door" and "Entry 3" of the data log file 300 indicates that the "Schlage Device command was processed" at 9:45 PM. By comparing the data received from the sensors with the data communicated by the smart devices, the smart home management system 10 may determine that the Schlage Device is located at the Front Door, and the Schlage Device command that was processed at 9:45 PM corresponds to the sensor data detected by S3. Thus, the smart home management system 10 may generate an assumption that the Schlage Device command was a "Lock Door Command" based on the detected sensor data from S3 indicating the lock moving towards the strike plate.

At block 410, the smart home management system 10 may provide a number of command assumptions for display on a user's computing device based on the received smart device data and the corresponding sensor data, such that a user may be notified of the content of an action. For example, as illustrated in FIG. 7, the screen 500 may also include a command assumption portion 520 for display such that a user can easily visualize one or more command assumptions 522 generated by the smart home management system 10 based on the smart activity data and the corresponding sensor data.

In some embodiments, the smart home management system 10 may, at block 412, receive a user input confirming the accuracy of the command assumptions that are provided by the smart home management system 10. That is, a user may indicate that a particular command assumption is correct or incorrect. For example, as illustrated in FIG. 7, the command assumption portion 520 may include an accuracy section 524 which may request the user to provide a response that the respective command assumption 522 is accurate via a "YES" button 526 or inaccurate via a "NO" button 528. As more command assumptions are generated and confirmed as accurate, the accuracy of future generated command assumptions may be improved.

Figure 8:
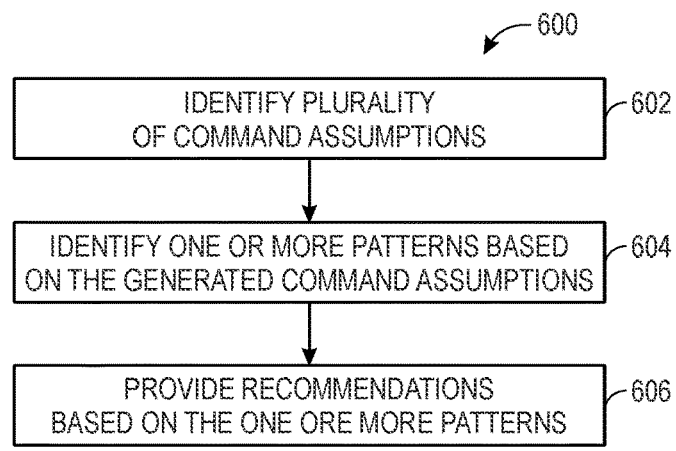
FIG. 8 illustrates a flow chart of a method for providing recommendations for actions occurring within the smart home management system of FIG. 1, in accordance with embodiments described herein.

FIG. 8 illustrates a flow chart of a method 600 employed by the smart home management system 10 for identifying patterns associated with the smart device and sensor data and providing recommendations for certain actions based on the identified patterns. Although the following description of the method 600 is described in a particular order, it should be noted that the method 600 is not limited to the depicted order; and instead, the method 600 may be performed in any suitable order. In addition, although the smart home management system 10 is described as performing the method 600, it should be understood that the method 600 may be performed by any suitable computing device including, for instance, the router 12 and the like. Further, it should be noted that the method 600 may include the steps described above with respect to FIGS. 3 and 6.

Referring now to FIG. 8, the smart home management system 10 may, at block 602, identify a plurality of command assumptions according to the method 100 of FIG. 3 and the method 400 of FIG. 6. As described above, the command assumptions may be generated based on the smart device data and the corresponding sensor data, and in some embodiments, the generated assumptions may be confirmed via user input.

As a number of identical generated command assumptions increases, the smart home management system 10 may, at block 604, identify one or more patterns based on the identical assumptions. In some embodiments, the smart home management system 10 may be configured to generate command assumptions based off of the smart device data and sensor data and when a number of identical command assumptions generated over a duration of time (e.g., a day, a week, a month) exceeds a threshold value, the smart home management system 10 may be able to identify a pattern. For example, as illustrated in the command assumption portion 520 of FIG. 7, the Phillips Light in Living Room 1 turns off at 9:45 PM, and the Schlage Device at the Front Door locks at 9:45 PM. The smart home management system 10 may be configured to identify a pattern when the number of identical generated assumptions exceeds a threshold value of 5 over the course of a week. Subsequently, over the next week, the smart home management system 10 may detect and generate identical command assumptions six times, thereby allowing the smart home management system 10 to identify a pattern that the Phillips Light in Living Room 1 should turn off at 9:45 PM when the Schlage Device at the Front Door is locked at 9:45 PM. In some embodiments, the smart home management system 10 may not identify patterns until a threshold number of generated assumptions are confirmed as accurate via user input, as described above.

After identifying a number of patterns based upon the generated assumptions, the smart home management system 10 may, at block 606, provide recommendations based upon the detected patterns. That is, the identified patterns may be indicative of an expected behavior of one or more associated smart devices, such that when a respective smart device does not perform according to the expected behavior, the smart home management system 10 may provide a notification or recommendation to check the smart device or confirm that the smart device is still functioning properly. For example, as noted above with respect to block 604, the smart home management system 10 may identify the pattern that the Schlage Device (e.g., "Smart Device 3" of FIG. 4) and the Phillips Light (e.g., "Smart Device 2") are controlled (e.g., locked or turned off) at the same time (i.e., 9:45 PM) each night. Subsequently, the smart home management system 10 may detect that the Phillips Light in Living Room 1 (i.e., Smart Device 2) was turned off at 9:45 PM as expected, but that the Schlage Device (i.e., Smart Device 3) was not locked as expected based on the identified pattern. The smart home management system 10 may then send a notification to the user which may include an indication that a respective smart device is not performing according to an identified pattern (e.g., "Schlage Device did not lock at 9:45 PM as expected"). In some embodiments, the notification may include an option or recommendation to provide an input response to allow the smart home management system 10 to control the respective smart device so that it may function according to the identified pattern (e.g., recommend locking the door based on identified pattern).

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

While only certain features of disclosed embodiments have been illustrated and described herein, many modifications and changes will occur to those skilled in the art. It is then, therefore, to be understood that the appended claims are intended to cover all such modifications and changes as fall within the true spirit of the present disclosure.

The invention claimed is:

1. A system, comprising:
 a computing device comprising a processor and a memory, wherein the memory stores instructions configured to cause the processor to:
  identify one or more smart devices communicating with one or more service providers;
  extract smart device data associated with the one or more smart devices, wherein the smart device data is indicative of one or more command signals sent from the one or more service providers and configured to control the one or more smart devices to perform one or more actions;
  identify one or more sensors disposed within a proximity of the one or more smart devices, wherein the one or more sensors are configured to collect sensor data associated with the one or more smart devices;
  receive the sensor data from the one or more sensors, wherein the sensor data is indicative of the one or more actions performed by the one or more smart devices;
  identify one or more command assumptions based on the sensor data and the smart device data, wherein the one or more command assumptions correspond to a content of the one or more command signals;
  provide the one or more command assumptions to an electronic device for display;
  identify one or more patterns in the smart device data and the sensor data, wherein the one or more patterns are indicative of an expected behavior of the one or more smart devices; and
  generate a schedule of commands based on the one or more patterns, wherein the schedule of commands is configured to control the one or more smart devices in lieu of the one or more command signals sent from the one or more service providers.

2. The system of claim 1, wherein the processor is configured to identify that a particular device corresponds to the one or more smart devices by determining that the particular device is controlled via the one or more command signals sent from a respective service provider of the one or more service providers.

3. The system of claim 1, wherein the smart device data is further indicative of information associated with the one or more smart devices, wherein the information comprises a manufacturer of the one or more smart devices, a service provider associated with the one or more smart devices, a type of the one or more smart devices, an activity performed by the one or more smart devices, or any combination thereof.

4. The system of claim 1, wherein the smart device data is further indicative of a respective MAC address associated with each of the one or more smart devices, wherein a first portion of each of the respective MAC addresses is indicative of a service provider of the one or more service providers, and wherein a second portion of each of the respective MAC addresses is indicative of a type of the one or more smart devices.

5. The system of claim 1, wherein the processor is configured to:
 generate a data structure of the smart device data, wherein the data structure comprises a source field, a data payload field, a destination field, and a time field; and
 provide a log of the data structure to the electronic device for display, wherein the log is indicative of one or more commands being processed by the one or more smart devices.

6. The system of claim 1, wherein the processor is configured to receive activity data, wherein the activity data corresponds to a schedule of the one or more actions to be performed by the one or more smart devices.

7. The system of claim 1, wherein the one or more smart devices comprises a light switch, a garage door, a camera, a door lock, or any combination thereof.

8. The system of claim 1, wherein the one or more sensors are configured to measure location, pressure, moisture, temperature, light, movement, or any combination thereof associated with the one or more smart devices.

9. The system of claim 1, wherein the processor is configured to identify the one or more patterns in the smart device data and the sensor data based on a number of identical command assumptions of the one or more command assumptions exceeding a threshold number of identical command assumptions within a threshold duration of time.

10. The system of claim 1, wherein the processor is configured to:
 determine that at least one smart device of the one or more smart devices is not performing according to the expected behavior associated with the one or more patterns; and
 provide one or more recommendations to the electronic device to control the at least one smart device to perform according to the expected behavior.

11. A non-transitory, computer-readable medium comprising computer-executable instructions that, when executed, are configured to cause a processor to:
 identify one or more smart devices communicating with one or more service providers over a network;
 extract smart device data from the one or more smart devices, wherein the smart device data is indicative of one or more commands sent from the one or more service providers configured to control the one or more smart devices to perform one or more actions;
 receive sensor data corresponding to the smart device data from one or more sensors disposed within a proximity of the one or more smart devices, wherein the sensor data is indicative of the one or more actions performed by the one or more smart devices;
 compare the smart device data and the sensor data;
 generate one or more command assumptions based on comparing the smart device data and the sensor data, wherein the one or more command assumptions are indicative of a content of the one or more commands; and
 identify one or more patterns in the smart device data and the sensor data based on a number of identical command assumptions of the one or more command assumptions exceeding a threshold number of identical command assumptions within a threshold duration of time, wherein the one or more patterns are indicative of an expected behavior of the one or more smart devices.

12. The non-transitory, computer-readable medium of claim 11, wherein the smart device data is further indicative of a manufacturer associated with the one or more smart devices, a service provider associated with the one or more smart devices, a type of the one or more smart devices, a time the one or more smart devices is controlled, an activity performed by the one or more smart devices, a name of the one or more smart devices, or any combination thereof.

13. The non-transitory, computer-readable medium of claim 11, wherein the processor is configured to:
provide an indication of the one or more command assumptions to an electronic device for display, wherein the indication comprises an accuracy section indicative of an accuracy of the one or more command assumptions; and
receive an input from a user, wherein the input is configured to confirm or reject the accuracy of the one or more command assumptions.

14. The non-transitory, computer-readable medium of claim 11, wherein the processor is configured to:
determine that at least one smart device of the one or more smart devices is not performing according to the expected behavior; and
provide one or more recommendations based on the one or more patterns, wherein the one or more recommendations comprises an option to provide an input response to control the at least one smart device according to the expected behavior.

15. The non-transitory, computer-readable medium of claim 11, wherein the processor is configured to generate a schedule of commands based on the one or more patterns, wherein the schedule of commands is configured to control the one or more smart devices in lieu of the one or more commands sent from the one or more service providers.

16. The non-transitory, computer-readable medium of claim 11, wherein the processor is configured to generate a data log of the smart device data, wherein the data log is indicative of the one or more commands being processed by the one or more smart devices and a respective time that the one or more commands are processed.

17. A method, comprising:
identifying, via a processor, one or more smart devices communicating with one or more service providers;
extracting, via the processor, smart device data associated with the one or more smart devices, wherein the smart device data is indicative of one or more command signals sent from the one or more service providers to cause the one or more smart devices to perform one or more actions;
identifying, via the processor, one or more sensors disposed within a proximity of the one or more smart devices, wherein the one or more sensors are configured to collect sensor data associated with the one or more smart devices;
receiving, via the processor, the sensor data from the one or more sensors, wherein the sensor data is indicative of the one or more actions performed by the one or more smart devices;
identifying, via the processor, one or more command assumptions based on the sensor data and the smart device data, wherein the one or more command assumptions correspond to a content of the one or more command signals;
providing, via the processor, the one or more command assumptions to an electronic device for display;
identifying, via the processor, one or more patterns in the smart device data and the sensor data, wherein the one or more patterns are indicative of an expected behavior of the one or more smart devices; and
generating, via the processor, a schedule of commands based on the one or more patterns, wherein the schedule of commands is configured to control the one or more smart devices in lieu of the one or more command signals sent from the one or more service providers.

18. The method of claim 17, comprising:
identifying, via the processor, a number of identical command assumptions over a duration of time from the one or more command assumptions; and
identifying, via the processor, the one or more patterns in the smart device data and the sensor data based on the number of identical command assumptions exceeding a threshold number of identical command assumptions and the duration of time being less than a threshold duration of time.

19. The method of claim 17, comprising:
determining, via the processor, that at least one smart device of the one or more smart device is not performing according to the expected behavior associated with the one or more patterns; and
providing, via the processor, one or more recommendations to the electronic device, wherein the one or more recommendations include an option to control the at least one smart device to perform according to the expected behavior.

20. The method of claim 17, comprising:
generating, via the processor, a data structure of the smart device data, wherein the data structure comprises a source field, a data payload field, a destination field, and a time field; and
providing, via the processor, a log of the data structure to the electronic device for display, wherein the log is indicative of one or more commands being processed by the one or more smart devices.

* * * * *